J. McMURTRY.
ELEVATOR.

No. 182,215. Patented Sept. 12, 1876.

WITNESSES.

INVENTOR.

UNITED STATES PATENT OFFICE.

JOHN McMURTRY, OF LEXINGTON, KENTUCKY.

IMPROVEMENT IN ELEVATORS.

Specification forming part of Letters Patent No. 182,215, dated September 12, 1876; application filed July 21, 1876.

*To all whom it may concern:*

Be it known that I, JOHN MCMURTRY, of Lexington, county of Fayette, in the State of Kentucky, have invented certain Improvements in Hoisters, of which the following is a specification:

My invention relates to an improvement in hoisters; and it consists in the peculiar arrangement and combination of parts, that will be more fully set forth hereinafter, whereby the ropes, pulleys, and weights are so combined as to dispense entirely with both the cog-gear and brakes that are usually employed.

Figure 1:
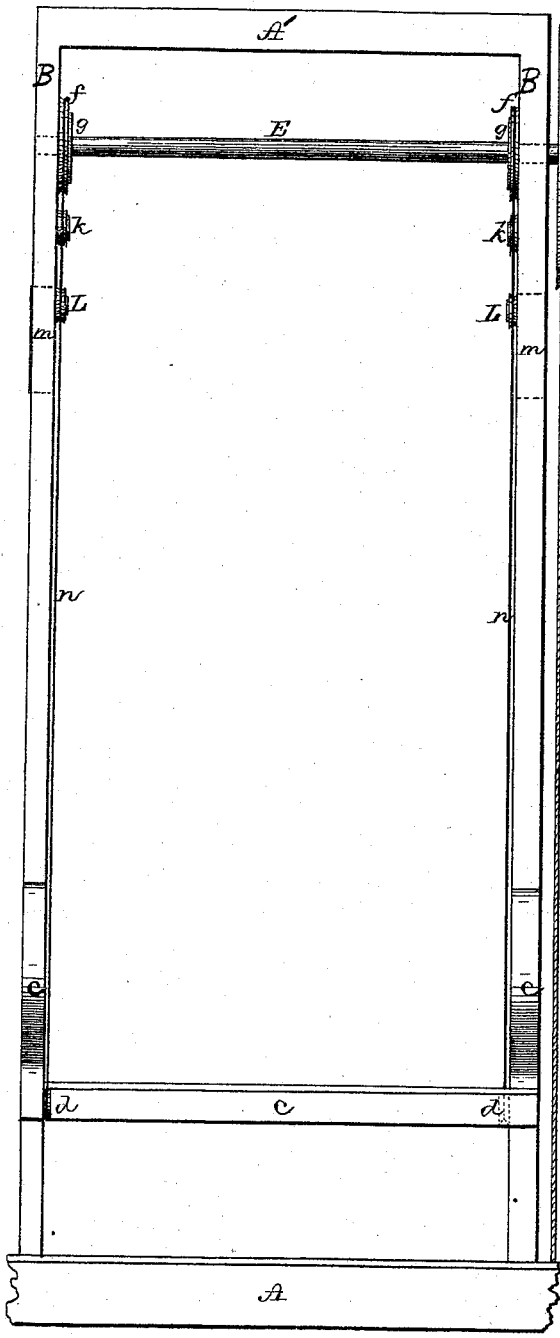
Figure 2:
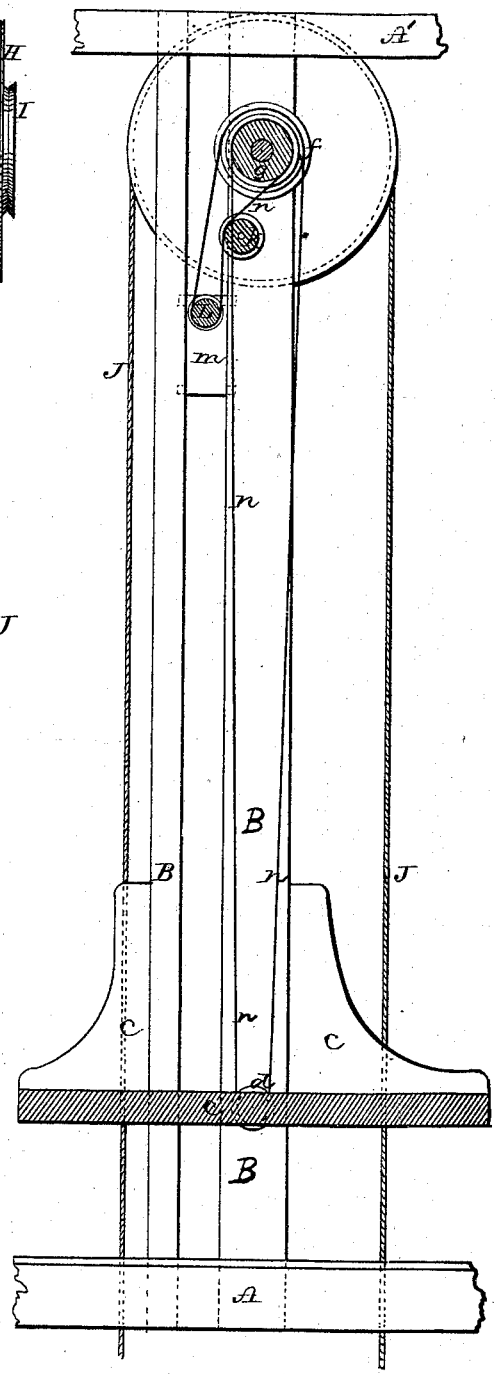

Figure 1 is a front elevation of a hoister embodying my invention. Fig. 2 is a transverse sectional view of same.

A represents the base-plate or foundation-piece of the frame of the hoister. A' represents the cross top-piece thereof. B B represent the posts for guiding the weights $m m$. $c c$ represent the movable platform, of common construction, excepting that it has a sheave-pulley on each side of same, marked $d d$. E is the main shaft, on which are keyed at each end, and inside of the posts A A, sheave-wheels $f f$ and $g g$, of different diameters, and having the grooves around the same made V-shaped, so as to prevent the rope from slipping on same when kept taut with the weights $m m$. H is the sheave-wheel of the common hoister, attached directly to the end of the main shaft E. Said sheave-wheel may have one or more sheaves attached to its outside, of different diameters, as I, for the purpose of gaining speed.

J J is the main driving-rope operating the hoister. $k$ and L are idlers, carrying the ropes from the sheave-wheels $f$ and $g$ connecting with the weights $m m$. $n n$ are the ropes connecting the sheave-wheels $f$ and $g$ with the platform $c$, and operating the same.

Mode of operation: Reference being had to Fig. 2 of the annexed drawing and the above description of same, it will be readily understood that the ropes $n n$ pass around pulleys $d d$ in the platform $c$, with the rope on the right passing over the sheave-wheel $f$ on the main shaft E, and the rope on the left passing over the smaller sheave-wheel $g$ in the opposite direction, and passing around same and down over the idler $k$, and also around the idler L on the weight $m$, and up toward and uniting with the opposite end of the rope from the large sheave-pulley $f$, thus forming an endless rope around the sheave-pulleys $f$ and $g$, and connecting with the platform and weights, as described.

Now, it is manifest that to operate the main shaft E by means of the driving-rope J the sheaves $f$ and $g$, being of different diameters, would take up and let off the ropes $n n$ unequally and in proportion to their diameters, and cause the platform $c$ to be raised and the weights $m m$ to be depressed in a corresponding degree.

It is also manifest that the ropes $n n$, passing, as they do, over the sheave-wheels $f$ and $g$ from opposite sides, and being kept taut on said sheave-wheels, and thus prevented from slipping, must lock the platform at the point where the main shaft ceases to operate, and thus render the usual brakes in hoisters entirely unnecessary.

Fiber ropes, or even wire ropes, over the sheave-wheels and idlers will necessarily work without friction, and be much freer from accidents than where everything depends on the quality of a single cast-iron cog, and the construction is certainly greatly simplified and cheapened.

This hoister can have attached to it any of the devices desired for protection against the breaking of the ropes or shifting the driving-belts, in case that steam-power is applied.

It will be observed, however, that the breaking of the driving-rope J would not effect any movement in the platform, which would only remain at rest in such an event.

The power of my improved hoister may be increased almost indefinitely by decreasing the difference in the diameters of the sheave-wheels $f$ and $g$ on the main shaft E, and the speed of the hoister can be increased by increasing the difference between the diameters of said sheave-wheels $f$ and $g$.

What I claim and desire to secure by Letters Patent, is—

The combination of the main shaft E, with its sheave-wheels $f$ and $g$, of different diameters, with the endless ropes $n\ n$ on same, and connected with the platform $c$, and the weights $m\ m$ over and around the idlers $d$, L, and $k$, and operated by the wheel I, or its equivalent, on the end of the main shaft E, substantially as described, and for the purpose set forth.

JOHN McMURTRY.

Witnesses:
 HENRY SCHAEFFER,
 G. W. LANCASTER.